US006271470B1

(12) United States Patent
Geibel

(10) Patent No.: US 6,271,470 B1
(45) Date of Patent: Aug. 7, 2001

(54) OIL FILLED POWER BUSHING WITH PISTON

(75) Inventor: David M. Geibel, Jackson, TN (US)

(73) Assignee: ABB Power T&D Company Inc., Raleigh, NC (US)

(*) Notice: Subject to any disclaimer, the term of this patent is extended or adjusted under 35 U.S.C. 154(b) by 0 days.

(21) Appl. No.: 09/481,672

(22) Filed: Jan. 12, 2000

(51) Int. Cl.[7] ........ H02G 3/18

(52) U.S. Cl. ........ 174/65 G; 174/65 SS; 174/135; 174/152 G; 174/153 G; 174/16; 174/2.2; 174/439; 174/604

(58) Field of Search ........ 174/65 G, 135, 174/153 G, 65 SS, 151, 152 G; 248/56; 16/2.1, 2.2; 439/604, 274

(56) References Cited

U.S. PATENT DOCUMENTS

| | | | | |
|---|---|---|---|---|
| 1,104,723 | | 7/1914 | Weiss . | |
| 2,452,580 | * | 11/1948 | E. C. Lee | 174/20 |
| 3,123,783 | | 3/1964 | Wilk et al. | 336/55 |
| 3,329,765 | * | 7/1967 | E. O. Juhun et al. | 174/7 G |
| 3,784,733 | * | 1/1974 | Farmer et al. | 174/153 R |
| 3,962,667 | * | 6/1976 | Link | 337/202 |
| 4,296,274 | * | 10/1981 | Cookson | 174/142 |
| 4,609,900 | | 9/1986 | Bachhofer et al. | 336/58 |
| 4,965,407 | * | 10/1990 | Hamm | 174/31 R |
| 5,709,289 | | 1/1998 | Peter et al. | 188/298 |
| 6,031,186 | * | 2/2000 | Sakich et al. | 174/167 |
| 6,069,316 | * | 5/2000 | Utke | 174/65 G |
| 6,150,607 | * | 11/2000 | Weyl et al. | 174/65 G |

* cited by examiner

*Primary Examiner*—Dean A. Reichard
*Assistant Examiner*—Dhiru R Patel
(74) *Attorney, Agent, or Firm*—Woodcock Washburn Kurtz Mackiewicz & Norris LLP

(57) ABSTRACT

An oil filled power bushing for a transformer in which the oil and nitrogen are separated by a movable piston within an expansion chamber for dividing said expansion chamber into a liquid filled section and a gas filled section, and means for sealing said piston with respect to a conductor and said expansion chamber.

3 Claims, 2 Drawing Sheets

OIL FILLED POWER BUSHING WITH PISTON

FIELD OF THE INVENTION

The present invention relates to an insulating liquid filled power bushing for high voltage apparatus and particularly to an insulating liquid filled power bushing for a transformer.

BACKGROUND OF THE INVENTION

In insulating liquid filled power bushings for high voltage apparatus such as oil filled bushings for transformers, the oil in the oil filled bushings is in contact with a cushion of gas that allows the oil to expand and contract due to thermal changes. When the oil expands, the gas is compressed and when the oil contracts, the gas expands to fill the space. As the pressure in the gas space varies and the temperature varies, the tendency for the oil to absorb and contain gas changes. As a result, gas is cyclically entering and leaving the oil over the life of the bushing. In some cases, the giving up of gas is so quick that it results in bubbles forming in the oil below the surface. These bubbles can occur in locations of high stress and produce partial discharge, which interferes with transformer testing and may reduce the life of the bushing in severe cases.

It would be desirable to provide an oil filled bushing where the oil is prevented from contacting the gas cushion. In this way, the oil can't absorb gas and remains devoid of large quantity of gas which make gas bubble evolution impossible.

SUMMARY OF THE INVENTION

It is an object of the present invention to incorporate a piston in the head of a power bushing to prevent the insulating oil from contacting the nitrogen gas and absorbing it. This prevents the nitrogen from being absorbed into the oil and later being released as bubbles, which causes partial discharge.

Accordingly, it is an object of the present invention to provide an insulating liquid filled power bushing for a transformer or other high voltage apparatus including an insulator having a chamber therein for receiving insulating liquid. An expansion chamber communicates with the insulator chamber for receiving insulating liquid and gas. A movable piston is mounted within the expansion chamber for dividing the expansion chamber into a liquid filled section and a gas filled section. A conductor extends through the insulator piston and the expansion chamber. A sealing means is provided for sealing the piston with respect to the conductor and the expansion chamber so as to prevent the gas in the gas filled section from communicating with the liquid in the liquid filled section thereby allowing the liquid to expand and contract due to thermal changes while preventing the liquid from absorbing the gas and making gas bubble evolution impossible. In one form of the invention a sight glass communicates with the insulator chamber and the expansion chamber for receiving insulating liquid and the conductor extends through the insulator, the sight glass, the piston and the expansion chamber. In one form of the invention the insulating liquid is an insulating oil and the gas is nitrogen.

For a more detailed disclosure of the invention and for further objects and advantages thereof, reference is to be had to the following description taken in conjunction with the accompanying drawings.

BRIEF DESCRIPTION OF THE DRAWINGS

Referring to the drawing which forms a part of this disclosure.

Figure 1:
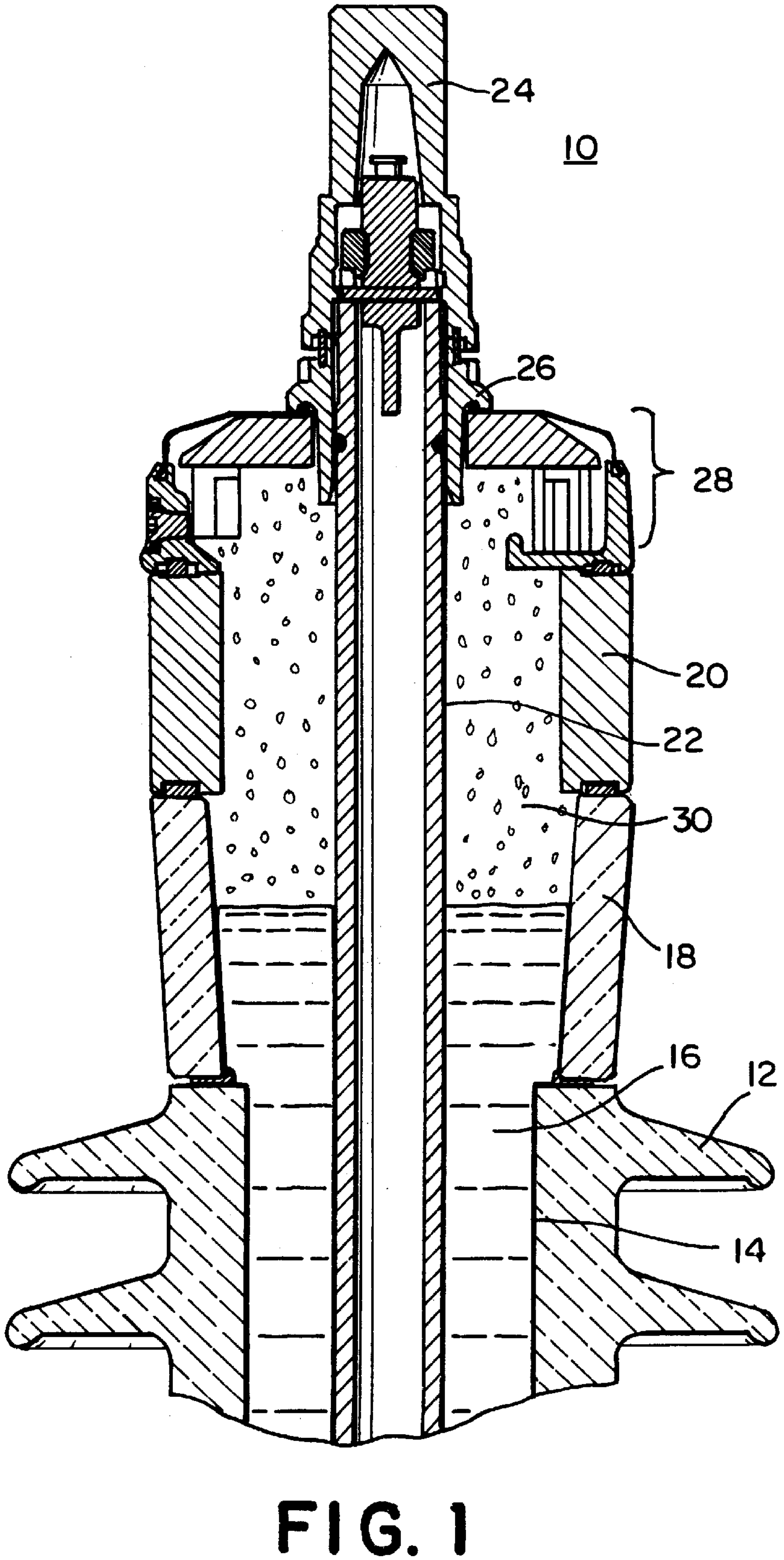
FIG. 1 PRIOR ART
FIG. 1 is a side elevational view in section of an insulating liquid filled power bushing of the prior art and, FIG. 2 is a side elevational view in section of an insulating liquid filled power bushing embodying the present invention.

A prior art insulating liquid filled power bushing 10 for a transformer or other high voltage apparatus is illustrated in FIG. 1. It includes a conventional insulator 12, as in U.S. Pat. No. 3,123,783, sometimes referred to an upper insulator having a chamber 14 therein for receiving an insulating liquid 16. An oil sight glass 18 communicates with the insulator chamber 14 and also with an expansion chamber 20. An electrical conductor 22 extends through the insulator 12, the sight glass 18 and the expansion chamber 20 and is provided at its outer end with a top terminal 24. The various parts of the bushing 10 are held together by means of a clamping nut 26 threadedly received on the conductor 22 and a spring assembly 28.

As may be seen in FIG. 1 the oil fills the chamber 14 within the insulator 12 and also extends upwardly into the interior of the sight glass 18. Above the liquid level in the sight glass 18 is a gas cushion preferably nitrogen 30. The gas 30 also extends into the expansion chamber 20. As will be seen in FIG. 1 the oil 16 in the oil filled bushing 10 is in contact with a cushion of gas 30 that allows the oil to expand and contract due to thermal changes. When the oil expands, the gas is compressed and when the oil contracts, the gas expands to fill the space. As the pressure in the gas space varies and the temperature varies, the tendency for the oil to absorb and contain gas changes. As a result, gas is cyclically entering and leaving the oil over the life of the bushing. In some cases, the giving up of gas is so quick that it results in bubbles forming in the oil below the surface. These bubbles can occur in locations of high stress and produce partial discharge, which interferes with transformer testing and may reduce the life of the bushing in severe cases.

DESCRIPTION OF THE PREFERRED EMBODIMENT

Figure 2:
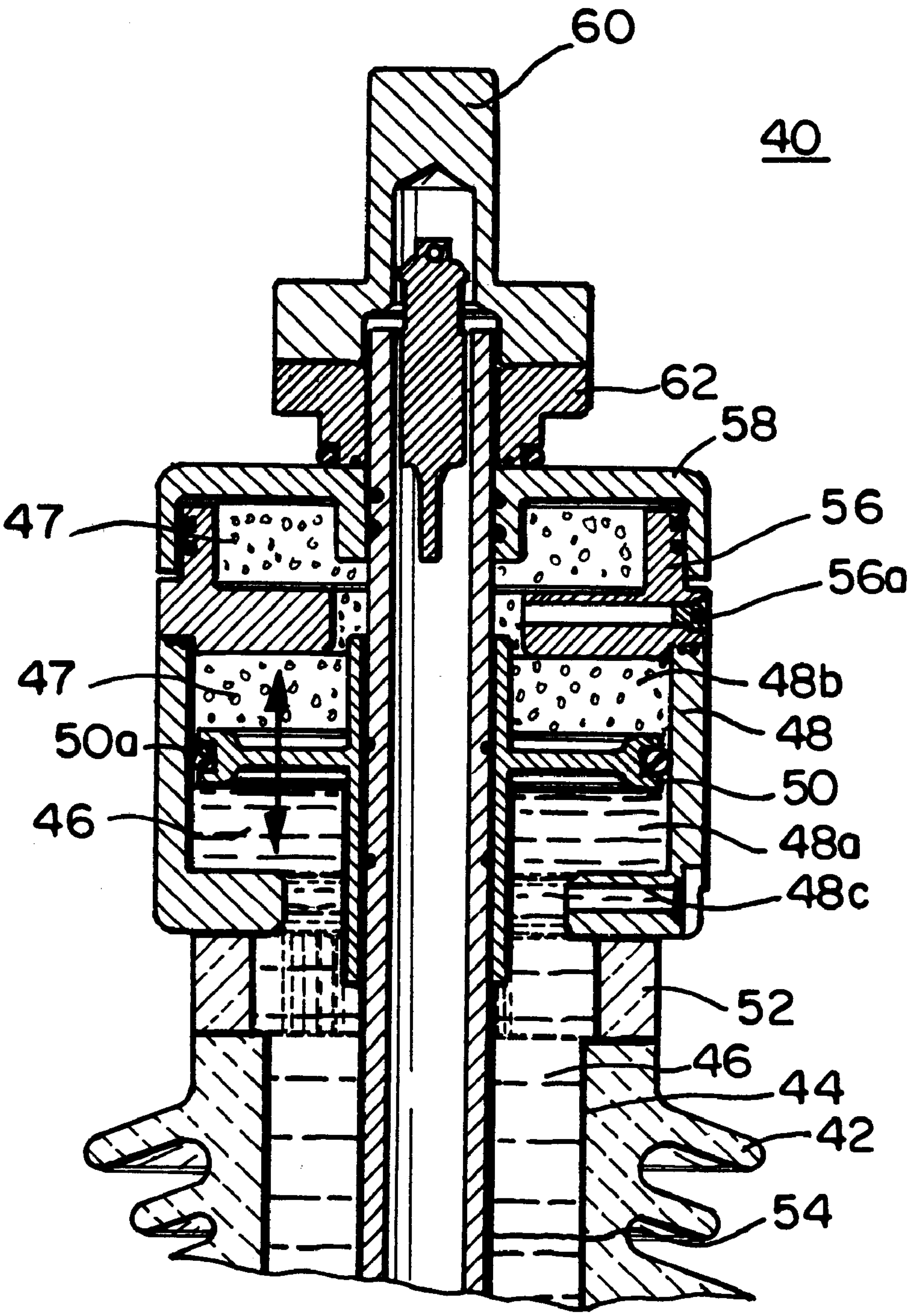

Referring to FIG. 2 there is illustrated a preferred embodiment of the invention wherein the oil within the power bushing is prevented from contacting the gas cushion as now to be described. As shown in FIG. 2 there is illustrated an insulating liquid filled power bushing 40 for a transformer or other high voltage apparatus including an insulator 42 having a chamber 44 therein for receiving an insulating liquid 46 such as an oil. An expansion chamber 48 communicates with the insulator chamber 44 for receiving insulating liquid 46 and gas 47. A movable piston 50 is slidably positioned within the expansion chamber 48 for dividing the expansion chamber 48 into a liquid filled section **48*a* and a gas filled section 48*b***.

A sight glass 52 communicates with the insulator chamber 44 and the liquid filled section **48*a* of the expansion chamber 48. An electrical conductor 54 extends through the insulator 42, the piston 50, the expansion chamber 48, and the sight glass 52. The conductor 54 also extends through a spring base 56 and cover 58 which is provided at its outer end with a top terminal 60. The various parts of the bushing 40 are held together by means of a clamping nut 62 threadedly received on the conductor 54 and the spring assembly including the spring base 56 and cover 58**.

As may be seen in FIG. 2 the piston 50 is adapted to move up and down in the direction of the arrows due to expansion and contraction. The periphery of the piston 50 is provided with sealing means including an O-ring **50*a* to seal the piston 50 with respect to the conductor and the expansion chamber 48 so as to prevent the gas 47 in the gas filled section 48***b* from communicating with the liquid 46 in the liquid filled section 48*a* thereby allowing the liquid to expand and contract due to thermal changes while preventing the liquid from absorbing the gas and making gas bubble evolution impossible.

To fill the bushing with oil the oil may be introduced into the inlet 48*c* in the expansion chamber 48. It will be noted that this inlet is beneath the piston 50. The bushing may also be charged with nitrogen gas byway of the inlet 56*a* in the spring base 56. It will be noted that the inlet 56*a* is located above the piston 50.

From the foregoing it will be seen that with the piston 50 preventing the nitrogen gas from moving out of the "bushing head", the bushing can be mounted or shipped in any position without the fear of gas moving to the wrong locations and becoming trapped. Also with the embodiment of the invention that is illustrated in FIG. 2, the piston 50 can be fixed in place during oil filling which simplifies the procedure and reduces the risk of improper filling.

While a preferred embodiment of the invention has been described and illustrated, it will be understood that further modifications may be made without departing from the spirit and scope of the invention as set forth in the appended claims.

What is claimed is:

1. An insulating liquid filled power bushing for a transformer or other high voltage apparatus comprising an insulator having a chamber therein for receiving insulating liquid, an expansion chamber communicating with said insulator chamber for receiving insulating liquid and gas, a movable piston within said expansion chamber for dividing said expansion chamber into a liquid filled section and a gas filled section, a conductor extending through said insulator, said piston and said expansion chamber, and means for sealing said piston with respect to said conductor and said expansion chamber so as to prevent the gas in said gas filled section from communicating with the liquid in the liquid filled section thereby allowing the liquid to expand and contract due to thermal changes while preventing the liquid from absorbing the gas and making gas bubble evolution impossible.

2. An insulating liquid filled bushing according to claim 1 including a sight glass communicating with said insulator chamber and said expansion chamber for receiving insulating liquid, said conductor extending through said insulator, said sight glass, said piston and said expansion chamber.

3. An insulating liquid filled bushing according to claim 1 wherein said insulating liquid is an insulating oil and said gas is nitrogen.

* * * * *